US008770858B2

(12) United States Patent
Lavoie et al.

(10) Patent No.: US 8,770,858 B2
(45) Date of Patent: Jul. 8, 2014

(54) SMALL FORM FACTOR PLUGGABLE UNIT

(76) Inventors: Renaud Lavoie, Laval (CA); Éric Dudemaine, Crabtree (CA); David Fromont, Lachine (CA)

(*) Notice: Subject to any disclaimer, the term of this patent is extended or adjusted under 35 U.S.C. 154(b) by 437 days.

(21) Appl. No.: 13/044,654

(22) Filed: Mar. 10, 2011

(65) Prior Publication Data
US 2011/0249944 A1 Oct. 13, 2011

Related U.S. Application Data

(60) Provisional application No. 61/322,504, filed on Apr. 9, 2010.

(51) Int. Cl.
*G02B 6/38* (2006.01)
*H01R 13/648* (2006.01)

(52) U.S. Cl.
USPC .......................................... 385/75; 439/607.24

(58) Field of Classification Search
USPC ........................................ 385/75; 439/607.24
See application file for complete search history.

(56) References Cited

U.S. PATENT DOCUMENTS 7,824,113 B2 * 11/2010 Wong et al. ..................... 385/92
2007/0237463 A1 * 10/2007 Aronson ........................... 385/89

* cited by examiner

*Primary Examiner* — Jerry Rahll

(57) ABSTRACT

The present relates to a small form-factor pluggable (SFP) unit. The SFP unit comprises a housing, a back panel, a front panel, and at least two connectors. The housing defines a top, a bottom and two sides, and is of standardized internal dimensions. The back panel is affixed to the housing. The front panel is affixed to a front portion of the housing and defines at least two apertures. The apertures are located in such a manner so as to define there between a non-horizontal line. The at least two connectors are adapted to be inserted in the apertures of the front panel.

3 Claims, 5 Drawing Sheets

SMALL FORM FACTOR PLUGGABLE UNIT

The present relates to a small form factor pluggable unit, and more particularly to a small form factor pluggable unit with particular frontal mechanical properties.

BACKGROUND

Small Form-factor Pluggable (SFP) units are standardized units adapted to be inserted within a chassis. The standard describes the size of the SFP unit, so as to ensure that all SFP fully-compliant and partially-compliant units may be inserted smoothly within one same chassis, i.e. inside cages, ganged cages, superposed cages and belly-to-belly cages.

SFP units may be used with various types of exterior connectors, such as coaxial connectors, optical connectors, and any other type of electrical connector.

As SFP units are small in dimensions, it is possible to limit the size of the chassis required to host several units simultaneously. And with the constant reduction of the electric, electronic and optic components used within the SFP units, the only limitation known today is due to the size of the connectors from which signals are received and transmitted there from.

However, such miniaturization of the SFP renders difficult the design of SFP units with one or more frontal connector. There is thus a need for an SFP unit capable of simultaneously housing multiple frontal connectors such as: coaxial connectors, DIN 1.0/2.3, SMA, SMB, SMC, HD BNC, mini BNC, etc, in a way that ganged cages are supported without restrictions.

BRIEF DESCRIPTION OF THE DRAWINGS

In the appended drawings, provided for exemplary purposes only, similar references denote like parts.

DETAILED DESCRIPTION

The foregoing and other features of the present will become more apparent upon reading of the following non-restrictive description of examples of implementation thereof, given by way of illustration only with reference to the accompanying drawings.

The present relates to a small form-factor pluggable (SFP) unit with particular frontal properties. More particularly, the SFP unit comprises a housing, a back panel, a front panel, and at least two connectors. The housing defines a top, a bottom and two sides, and corresponds at least partially to standardized dimensions. The back panel is affixed to a back section of the housing. The front panel is affixed to a front section of the housing. The front panel comprises at least two apertures defining there between a non-horizontal line, or are said to be offset. The at least two connectors are adapted to be inserted and affixed in the apertures of the front panel.

In the context of the present SFP unit, the following terminology is used:

SFP: Small Form Factor Pluggable Unit corresponding to SFP and SFP+ standards.

Figure 1:
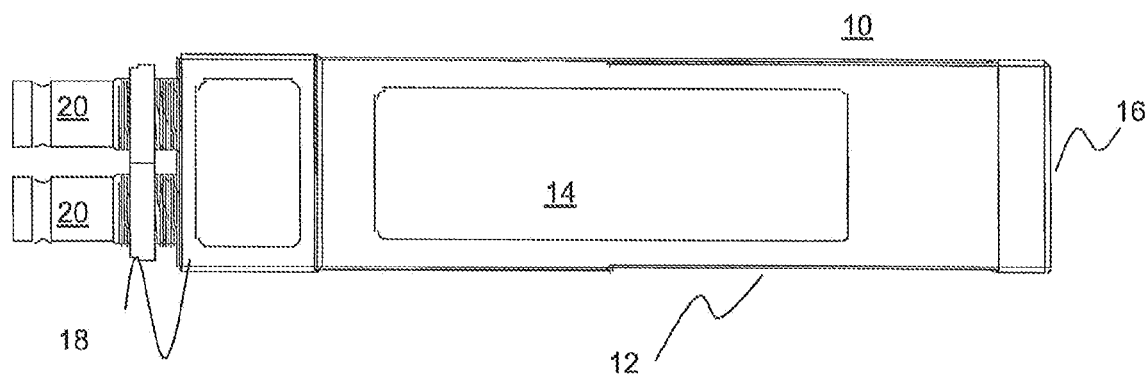
FIG. 1 is a top elevation view of a SFP unit in accordance with an aspect.
Figure 2:
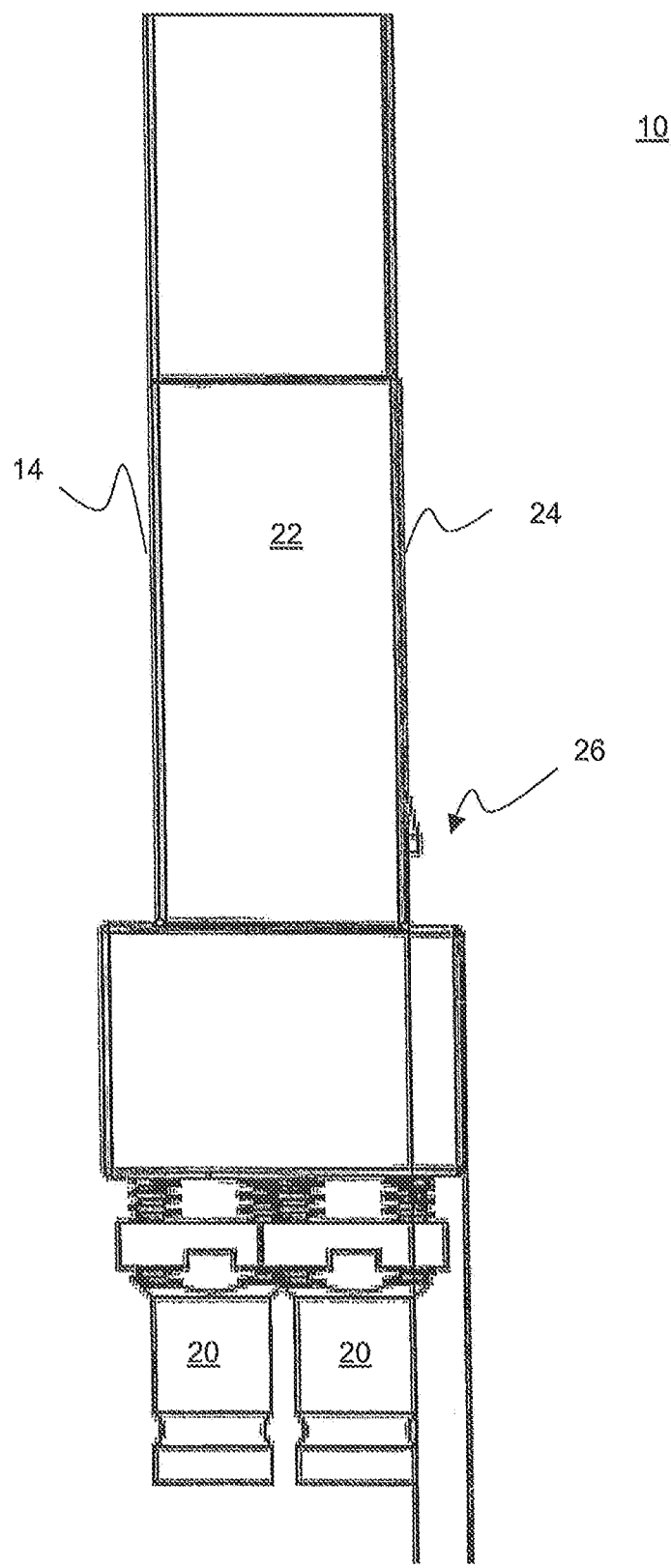
FIG. 2 is a side elevation view of the SFP unit in accordance with another aspect.

Reference is now made to concurrently to FIGS. 1 and 2, where FIG. 1 is a top elevation view of a SFP unit 10 in accordance with an aspect, and FIG. 2 is a side elevation view. The SFP unit 10 comprises a housing 12. The housing defines a top portion 14, a bottom portion 24, and two sides 22. The housing 12 is at least partially of dimensions in compliance with the SFP and SFP+ standards or having functional dimensions based on the SFP or SFP+ standards.

The SFP unit 10 further comprises a back panel 16 affixed to the housing 12. Although not shown, the back panel may comprise for example an electrical or an optical connector.

The SFP unit 10 further comprises a front panel 18 affixed to the housing 12. The front panel defines at least two apertures, which are not horizontally aligned. Two of the apertures define there between a non-horizontal line, such as for example a slope, or a vertical line (between the top and bottom portion), and are thus in an offset geometry with respect to an imaginary horizontal line on the front panel. At least two apertures are adapted for receiving connectors 20 or when not in used a cap 30 (as shown on FIG. 5).

Figure 3:
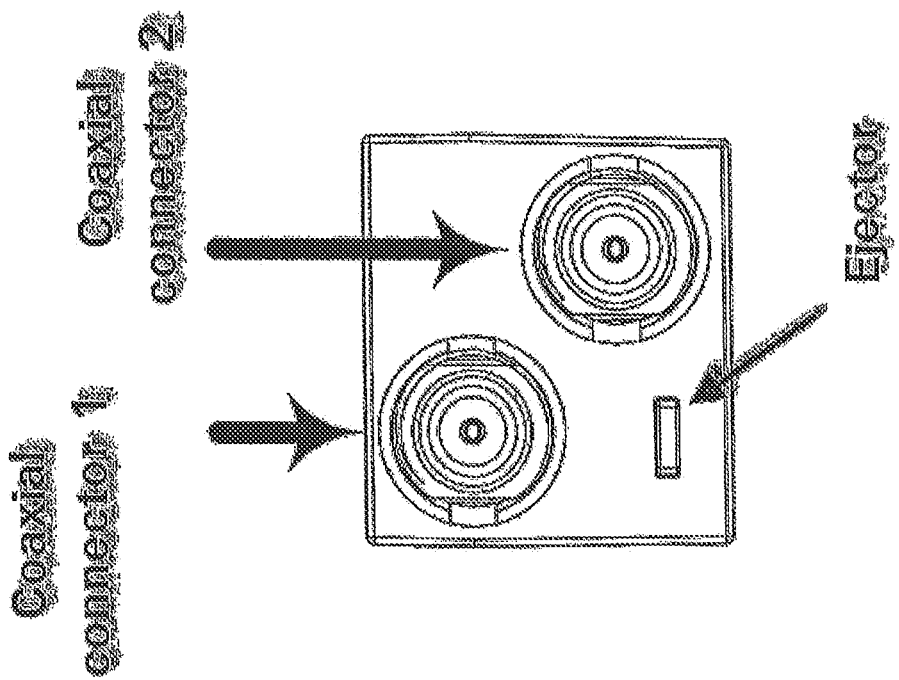
FIG. 3 is a front elevation view of the SFP unit in accordance with an aspect.
Figure 4:
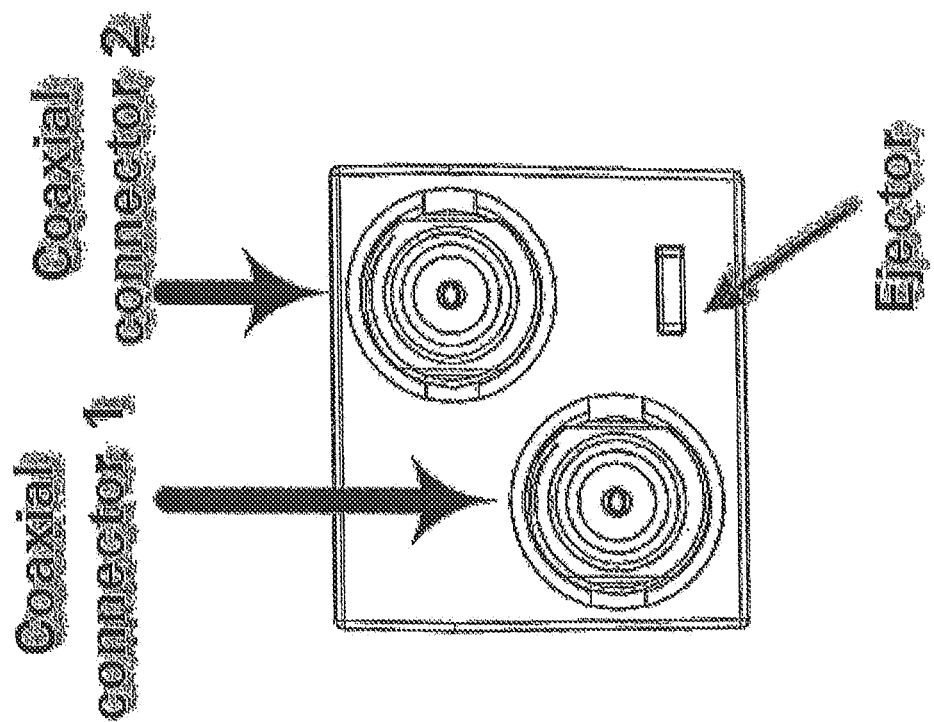
FIG. 4 is a front elevation view of the SFP unit in accordance with another aspect.

Reference is now made to FIGS. 3 and 4, which respectively depict front elevation views of the SFP unit in accordance with different aspects. The connectors 20 are inserted in the apertures of the front panel 18 of the SFP unit 10. Each of the connectors may consist of any of the following: a coaxial connector, an optical connector, or any type of electrical connector suited to be inserted within an SFP unit. Although FIGS. 3 and 4 depict coaxial connectors and apertures defining a sloped line, the present SFP unit is not limited to such an implementation.

The SFP unit 10 further comprises an ejection mechanism. The ejection mechanism is integrated within the housing 12, and comprises an actuator located in the front panel. A latch 26 of the ejection mechanism is shown on FIG. 2.

Figure 5:
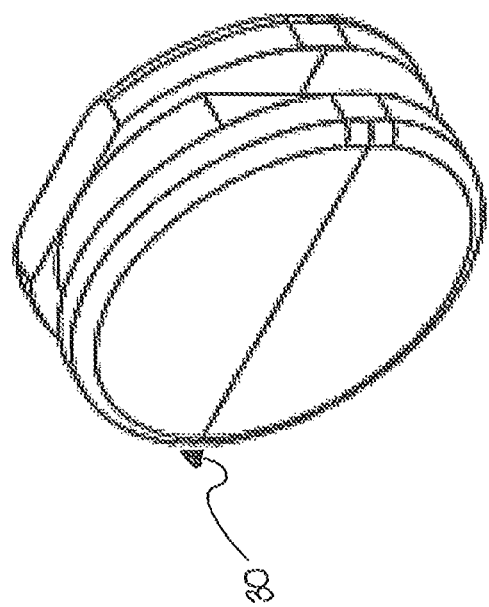
FIG. 5 is a perspective view of a cap adapted to fit in the aperture.

Reference is now made to FIG. 5 is a perspective view of a cap adapted to fit in the aperture. When only one connector 20 is used with the SFP unit 10, the cap 30 may be inserted within the unused aperture, so as to completely close the front panel 18.

Because of its particular front panel 18, the present SFP unit 10 allows ganged cages, superposed cages configuration without any interference, blocking cages. The ejection mechanism may be internally to the SFP unit 10, increasing robustness and ease of use. However, a fully external or partially external ejection mechanism could also be used. Multiple coaxial connectors 20 can be simultaneously supported with the present SFP unit 10.

Although the present SFP unit has been described in the foregoing description by way of illustrative embodiments thereof, these embodiments can be modified at will, within the scope of the appended claims without departing from the spirit and nature of the present SFP unit.

What is claimed is:

1. A small form-factor pluggable (SFP) unit comprising:
   a housing, the housing defining a top, a bottom and two sides, the housing corresponding to standardized dimensions and being adapted to be inserted in a chassis;
   a back panel affixed to the housing;
   a front panel affixed to the housing, the front panel defining at least two apertures, the apertures defining there between a sloped line with respect to the top of the housing; and
   two connectors adapted to be inserted in the apertures of the front panel, at least one of the connectors being an electrical connector.

2. The SFP unit of claim 1, wherein the standardized dimensions of the housing corresponds to any of the following: Small Form-Factor Pluggable standard and Small Form-Factor Pluggable + standard.

3. The SFP unit of claim 1, further comprising an ejection mechanism integrated to the housing, the ejection mechanism comprising an actuator located in the front panel.

\* \* \* \* \*